United States Patent
Strøm et al.

(10) Patent No.: US 12,120,622 B2
(45) Date of Patent: Oct. 15, 2024

(54) RADIO APPARATUS FOR COMMUNICATING DIGITAL AUDIO STREAMS

(71) Applicant: Nordic Semiconductor ASA, Trondheim (NO)

(72) Inventors: Nils Strøm, Trondheim (NO); Anders Nore, Trondheim (NO); Rolf Ambühl, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 320 days.

(21) Appl. No.: 17/637,224

(22) PCT Filed: Aug. 20, 2020

(86) PCT No.: PCT/EP2020/073372
§ 371 (c)(1),
(2) Date: Feb. 22, 2022

(87) PCT Pub. No.: WO2021/037681
PCT Pub. Date: Mar. 4, 2021

(65) Prior Publication Data
US 2022/0286986 A1  Sep. 8, 2022

(30) Foreign Application Priority Data
Aug. 23, 2019 (GB) ..................... 1912169

(51) Int. Cl.
*H04W 56/00* (2009.01)
*G06F 3/16* (2006.01)
(Continued)

(52) U.S. Cl.
CPC .......... *H04W 56/002* (2013.01); *G06F 3/162* (2013.01); *H04R 1/025* (2013.01); *H04R 3/00* (2013.01); *H04S 1/007* (2013.01)

(58) Field of Classification Search
None
See application file for complete search history.

(56) References Cited

U.S. PATENT DOCUMENTS 9,398,534 B2    7/2016  Berntsen et al.
2002/0031086 A1*  3/2002  Welin ............... H04L 47/24
                                              370/428

(Continued)

FOREIGN PATENT DOCUMENTS

EP        2 897 384 A2    7/2015
WO    WO 2011/028848 A1   3/2011
WO    WO 2013/088121 A1   6/2013

OTHER PUBLICATIONS

IPO Search Report under Section 17(5) for Application No. GB1912169. 8, dated Jan. 28, 2020, 3 pages.
(Continued)

*Primary Examiner* — Andre Tacdiran
(74) *Attorney, Agent, or Firm* — Klarquist Sparkman, LLP (57) ABSTRACT

A radio receiver apparatus comprises radio circuitry for receiving a sequence of radio data packets, transmitted at regular intervals, wherein the sequence of radio data packets encodes a digital audio stream and each radio data packet encodes a respective number of audio samples from the digital audio stream. The apparatus also comprises a digital audio interface for outputting audio samples from the received digital audio stream, a controllable oscillator arranged to control an output rate at which the audio samples are output from the digital audio interface, and a timer. The apparatus also comprises control logic, configured to use the timer to measure an interval between receiving each of a pair of the radio data packets, and to control the oscillator to vary the output rate incrementally, in a number of steps, while outputting the audio samples from one radio data packet.

(Continued)

The number of steps, or the size of each step, or both, depends on the measured interval.

20 Claims, 8 Drawing Sheets

(51) Int. Cl.
*H04R 1/02* (2006.01)
*H04R 3/00* (2006.01)
*H04S 1/00* (2006.01)

(56) References Cited

U.S. PATENT DOCUMENTS

| | | |
|---|---|---|
| 2003/0043856 A1 | 3/2003 | Lakaniemi et al. |
| 2006/0149850 A1 | 7/2006 | Bowman |
| 2011/0216785 A1* | 9/2011 | Begen ............ H04J 3/18 370/477 |
| 2012/0113856 A1* | 5/2012 | Krishnaswamy ....... H04L 65/80 370/252 |
| 2015/0067108 A1* | 3/2015 | Mamidwar ........... H04L 47/621 709/219 |
| 2015/0207910 A1* | 7/2015 | Tennant ................ H04W 52/38 455/418 |
| 2017/0069338 A1 | 3/2017 | Elliot et al. |
| 2021/0410090 A1* | 12/2021 | Volkov ................ H04W 56/004 |

OTHER PUBLICATIONS

International Search Report and Written Opinion for PCT/EP2020/073372, mailed Dec. 8, 2020, 15 pages.

Castor-Perry, "Programmable Clock Generation and Synchronization for USB Audio Systems," *The Ins and Outs of Audio—AES 24th UK Conference 2011*, Feb. 2011, 10 pages.

* cited by examiner

RADIO APPARATUS FOR COMMUNICATING DIGITAL AUDIO STREAMS

CROSS REFERENCE TO RELATED APPLICATIONS

This is the U.S. National Stage of International Application No. PCT/EP2020/073372, filed Aug. 20, 2020, which was published in English under PCT Article 21(2), which in turn claims the benefit of Great Britain Application No. 1912169.8, filed Aug. 23, 2019.

BACKGROUND OF THE INVENTION

This invention relates to radio apparatus and methods for communicating a digital audio stream.

It is known to transmit a digital audio stream, such as an MPEG or aptX encoded stream, over a radio communication link, such as a Bluetooth™ or WiFi channel, for output in substantially real-time (i.e., with minimal buffering at the receiving device). Such techniques may be used in wireless telephony headsets, wireless earphones, wireless loudspeakers, etc.

However, when the transmitting device and the receiving device do not contain synchronised clocks, it is not straightforward to ensure that the received digital audio stream is converted to an analog signal (or processed in some other way) at a rate that avoids introducing audible artefacts. Such artefacts may arise, for example, due to a buffer underrun, or due to abrupt changes made to the output rate in order to avoid a buffer underrun.

The present invention seeks to address this problem.

SUMMARY OF THE INVENTION

From a first aspect, the invention provides a radio communication system comprising a radio transmitter apparatus and a first radio receiver apparatus, wherein the radio transmitter apparatus is configured to transmit a sequence of radio data packets to the first radio receiver apparatus at regular intervals, the sequence of radio data packets encoding a digital audio stream, wherein each radio data packet encodes a respective number of audio samples from the digital audio stream, and wherein the first radio receiver apparatus comprises:

radio circuitry for receiving the sequence of radio data packets;
a digital audio interface for outputting audio samples from the received digital audio stream;
a controllable oscillator configured to control an output rate at which the audio samples are output from the digital audio interface;
a timer; and
control logic configured to use the timer to measure an interval between receiving each of a pair of the radio data packets, and to control the oscillator to vary said output rate incrementally, in a number of steps, while outputting the audio samples from one radio data packet, wherein the number of steps, or the size of each step, or both, depends on said measured interval.

From a second aspect, the invention provides a radio receiver apparatus comprising:

radio circuitry for receiving a sequence of radio data packets, transmitted at regular intervals, the sequence of radio data packets encoding a digital audio stream, wherein each radio data packet encodes a respective number of audio samples from the digital audio stream;
a digital audio interface for outputting audio samples from the received digital audio stream;
a controllable oscillator configured to control an output rate at which the audio samples are output from the digital audio interface;
a timer; and
control logic configured to use the timer to measure an interval between receiving each of a pair of the radio data packets, and to control the oscillator to vary said output rate incrementally, in a number of steps, while outputting the audio samples from one radio data packet, wherein the number of steps, or the size of each step, or both, depends on said measured interval.

From a third aspect, the invention provides a method of processing a digital audio stream, the method comprising:

receiving a sequence of radio data packets, transmitted at regular intervals, the sequence of radio data packets encoding a digital audio stream, wherein each radio data packet encodes a respective number of audio samples from the digital audio stream;
outputting audio samples from the received digital audio stream at a variable output rate;
measuring an interval between receiving each of a pair of the radio data packets; and
adjusting the variable output rate incrementally, in a number of steps, while outputting the audio samples from one radio data packet, wherein the number of steps, or the size of each step, or both, depends on said measured interval.

Thus it will be seen that, in accordance with the invention, audio samples from a single data packet are output at a rate that can, when appropriate, change over the course of the single packet, where the rate of change to the output rate depends on a measured interval between incoming radio packets. In this way, the receiver can avoid buffer underrun or buffer overflow by correcting the output rate within the span of a single packet, while avoiding abrupt changes to the output rate. The receiver may also, at least in some embodiments, be able to control the audio output rate more efficiently (e.g., using lower power consumption) than devices that use asynchronous sample rate converters.

In some embodiments, the number of steps (when not zero) could be as low as one step, at least for one or more received radio data packets. However, in preferred embodiments, the control logic may be able to control the oscillator to vary the output rate in a plurality of steps, while outputting the audio samples from one radio data packet—e.g., changing the output rate at least two, ten, or a hundred or a thousand times, while outputting the audio samples contained in one data packet. A high number of steps reduces any artefacts due to step changes in the output rate, by enabling the output rate to be varied closer to linearly over the duration of one data packet.

In some embodiments, the step size and/or number of steps are fixed while outputting all the audio samples from one radio data packet. The control logic may be configured to determine a respective step size and/or a respective number of steps for outputting the audio samples from each successive radio data packet.

In some embodiments, the control logic may be configured to determine a number of steps repeatedly, before, or when, commencing output of the audio samples from each successive radio data packet.

In some circumstances, there may be no need to change the output rate; thus, for some packets, the step size and/or number of steps may be set at zero.

The controllable oscillator may provide an interface (e.g. a register interface) for receiving data, from the control logic, that is representative of the step size and/or of the number of steps. The oscillator may comprise circuitry for making incremental changes to its output rate, e.g. over a predetermined period (e.g., the nominal duration of the audio stream contained in one data packet), in dependence on a received step size and number of steps. In some embodiments, the controllable oscillator may provide an interface for configuring a step interval. The step interval may be selectable from a set of step interval values. The step interval may be configurable so as to correspond, when the step size is non-zero, to between approximately 100 steps and approximately 1,000 steps over the interval between receiving the pair of radio data packets.

The controllable oscillator may comprise a sigma-delta modulator.

The receiver may comprise interface circuitry (e.g. an I2S peripheral) for controlling the output of the audio samples from the digital audio interface. The controllable oscillator may output a periodic signal to the audio interface circuitry, which may determine the output rate from the digital audio interface. The audio interface circuitry may set the output rate to be equal to the frequency of the periodic signal, or to be a predetermined multiple or fraction of this frequency.

The digital audio interface may be an external interface of the receiver apparatus—e.g. a S/PDIF (Sony/Philips Digital Interface) port. However, in other embodiments, it is an internal interface—e.g., a connection to an Inter-IC Sound (I2S) bus of the receiver apparatus—which may be used for outputting the audio samples to another component of the receiver apparatus—e.g., to a digital-to-analog converter (DAC) within the receiver apparatus.

In some embodiments, the radio receiver apparatus comprises a DAC, an amplifier, and an acoustic transducer such as a loudspeaker, for outputting the audio stream as sound. The radio receiver apparatus may be or comprise a wireless headset, wireless earphones, a wireless loudspeaker, a smartphone, home assistant, or any other device with audio output capabilities.

The radio transmitter apparatus may be or comprise a server, a router, a television, a smartphone, a cellular network base station, or any other appropriate device or apparatus.

The radio transmitter apparatus and radio receiver apparatus may be unsynchronised (apart from through the periodic transmission of the radio data packets). They may comprise respective clocks which are not synchronised to each other. The receiver apparatus may use its unsynchronised clock for providing a clock signal to digital logic in the radio circuitry and/or control logic.

In some embodiments, each radio data packet of the sequence of radio data packets may encode the same number of audio samples from the digital audio stream.

The pair of received radio data packets may be adjacent radio data packets of the sequence of radio data packets, although this is not essential. They may be the two most-recently received radio packets of the sequence.

The interval may be between a time of receipt of a first element within a first radio data packet and a time of receipt of a second element within a second radio data packet. The first and second elements may have a common position with the respective data packets. They may be address fields within the respective packets. In this way, the interval can be timed consistently between a plurality of pairs of packets within the sequence.

The intervals between receiving every adjacent pair of radio data packets within the sequence may be measured. Each interval may be used to adjust the variable output rate for outputting the audio samples of a radio data packet, which may be one of the radio data packets of the respective pair (e.g. the later-received packet of the pair), or another subsequently-received radio data packet.

The timer may comprise a hardware timer circuit or a software-based timer. A hardware timer may provide greater accuracy.

The control logic may be configured to determine repeatedly, every time a radio data packet of the sequence is received, whether to adjust the output rate.

The control logic may comprise hardwired control circuitry—i.e. digital logic. However, in some embodiments, the receiver apparatus comprises a processor (e.g., an Arm™ Cortex-M™ processor) and a memory storing software for execution by the processor. The control logic may be implemented at least in part by said software.

The control logic may control the oscillator by writing a value representative of the number of steps and/or a value representative of the step size to one or more registers of the controllable oscillator.

The oscillator may have a starting frequency, which may be configurable—e.g., by writing to a register of the oscillator. The control logic may set the starting frequency once for the digital audio stream (e.g. before receiving the first packet of the stream). It may then adjust the output rate incrementally, when required, by controlling the step size and number of steps to be implemented over each data packet of the sequence of radio data packets, for the duration of the audio stream.

The receiver apparatus may be configured to measure an interval between outputting each of a pair of frames of audio samples, where each frame consists of the audio samples contained in a respective radio data packet. The number of steps, or the size of each step, or both, may further depend on the measured interval between a pair of output frames. The receiver may use a hardware timer to perform this measuring. The pair of frames may be adjacent frames of the audio stream, although this is not essential. The interval may be between an output of a first element within a first frame and an output time of a second element within a second frame. The first and second elements may have a common position with the respective frames. They may be the first sample of each frame.

The control logic may be configured to compare the interval between receiving each of the pair of radio data packets with the interval between outputting the audio samples contained in these radio data packets, or contained in a second pair of radio data packets. This second pair of data packets may have one radio data packet in common with the first pair of data packets, or may consist of two further data packets (e.g., two earlier-received data packets). In some situations, it may be advantageous to use the same two radio packets, as the interval between these packets may capture any short-term changes to the clock rate of the transmitter apparatus that occurred while the corresponding audio samples were generated or processed for transmission. If an earlier radio packet interval is used, or if the interval is measured over a plurality of radio packets, such changes may be missed, resulting in less accurate sample rate reconstruction.

The control logic may calculate the step size and/or number of steps so as to give an average (mean) output rate, over a time window, that equals the transmission rate over an interval of the same duration as the time window (but potentially temporally offset from the time window). The time window may have a duration equal to the duration of the (uncompressed) digital audio stream that is communicated by two radio data packets, or by one radio data packet, or any other duration. Targeting a correct average rate over two radio packets allows for a buffering delay of one whole radio packet, which may help to ensure uninterrupted audio output.

In some embodiments. the control logic may be configured to determine a step size and/or number of steps that achieves a desired output rate for the minimum step size, subject to any constraints on step sizes and/or step intervals set by the apparatus. It may control the oscillator to use this step size and/or number of steps. This may help to reduce audible distortion in situations where more than one combination of step size and step interval would achieve the desired output rate.

The digital audio stream may be compressed within the radio data packets. It may be compressed according to an MPEG, aptX, or other audio stream protocol. The receiver apparatus may comprise circuitry and/or software for decompressing the audio samples.

The structure of the radio data packets and/or the radio communication protocol used by the radio transmitter and receiver may comply partly or wholly with a version of the Bluetooth™ or Bluetooth™ Low Energy specifications. The digital audio stream may transmitted over one or more Bluetooth™ Low Energy isochronous channels.

The receiver apparatus may comprise a buffer memory for buffering the audio samples from the received digital audio stream before outputting the audio samples from the digital audio interface. The buffer memory may receive the audio samples from a decompression unit or codec. The buffer memory may be sized to hold the audio samples from at least one, two or more radio data packets. It may comprise a set (e.g. a pair) of buffers (e.g., first-in-first-out buffers), which may be used cyclically or alternately for buffering the audio samples from respective successive radio data packets. A pair of buffers, each sized to hold exactly the audio samples from one radio data packet, may provide a particularly memory-efficient implementation, while avoiding buffer underrun.

In some embodiments, the radio communication system may comprise a second radio receiver apparatus. It may be configured to receive a second audio stream from the radio transmitter apparatus. For example, the first receiver may receive the left stream of a stereo audio stream, while the second receiver may receive the right stream. The second receiver may have any of the feature disclosed herein in the context of the first radio receiver. Both receivers may align their audio output rates with the transmission rate of the transmitter apparatus. Each radio receiver may be configured to start outputting the audio stream at the same predetermined interval after receiving a first radio data packet of the sequence. Thus, the two streams may be kept in alignment for the duration of the audio stream. The system may comprise further receivers—e.g. as part of a Dolby™ 5.1 surround sound system.

In some embodiments, the radio receiver apparatus may be radio transceiver apparatus. It may be further configured to transmit a sequence of outgoing radio data packets encoding an outgoing digital audio stream. Each outgoing radio data packet may encode a respective number of audio samples from the outgoing digital audio stream, which may be a constant number over the stream. The outgoing radio data packets may be transmitted to the aforesaid radio transmitter apparatus, or to a different apparatus. The radio receiver apparatus may comprise a microphone or other audio input for generating the outgoing digital audio stream. Such an arrangement may be useful where, for example, full-duplex or half-duplex telecommunications support is required, such as in a voice-controlled home assistant device.

The radio transceiver apparatus may comprise a digital audio interface for receiving audio samples for transmission in the outgoing digital audio stream, and a buffer memory for buffering the audio samples received at the outgoing digital audio interface. It may comprise a controllable oscillator (which may be the aforementioned controllable oscillator or a different oscillator) configured to control a buffering rate at which audio samples are input to the buffer memory. It may comprise control logic configured to control the oscillator to vary said buffering rate incrementally, in a number of steps, while inputting the audio samples for one radio data packet to the buffer memory. The number of steps, or the size of each step, or both, may depend on the aforesaid measured interval.

In some embodiments, the radio transceiver apparatus need not necessarily receive and process an incoming digital audio stream at all.

Thus, from a further aspect, the invention provides a radio communication system comprising a radio transmitter apparatus and a radio transceiver apparatus, wherein the radio transmitter apparatus is configured to transmit a sequence of radio data packets to the radio transceiver apparatus at regular intervals, and wherein the radio transceiver apparatus comprises:

radio reception circuitry for receiving the sequence of incoming radio data packets;

radio transmission circuitry for transmitting a sequence of outgoing radio data packets encoding an outgoing digital audio stream, wherein each respective outgoing radio data packet of the sequence of outgoing radio data packets corresponds to a respective incoming radio data packet of the sequence of incoming radio data packets;

a digital audio interface for receiving audio samples for transmission in the outgoing digital audio stream;

a buffer memory for buffering the audio samples received at the digital audio interface;

a controllable oscillator configured to control a buffering rate at which audio samples are input to the buffer memory;

a timer; and control logic configured to use the timer to measure an interval between receiving each of a pair of the incoming radio data packets, and to control the oscillator to vary said buffering rate incrementally, in a number of steps, while inputting the audio samples for one radio data packet to the buffer memory, wherein the number of steps, or the size of each step, or both, depends on said measured interval.

From another aspect, the invention provides a radio transceiver apparatus comprising:

radio reception circuitry for receiving a sequence of incoming radio data packets, transmitted at regular intervals;

radio transmission circuitry for transmitting a sequence of outgoing radio data packets encoding an outgoing digital audio stream, wherein each respective outgoing radio data packet of the sequence of outgoing radio data packets corresponds to a respective incoming radio data packet of the sequence of incoming radio data packets;

a digital audio interface for receiving audio samples for transmission in the outgoing digital audio stream;

a buffer memory for buffering the audio samples received at the digital audio interface;

a controllable oscillator configured to control a buffering rate at which audio samples are input to the buffer memory;

a timer; and control logic configured to use the timer to measure an interval between receiving each of a pair of the incoming radio data packets, and to control the oscillator to vary said buffering rate incrementally, in a number of steps, while inputting the audio samples for one radio data packet to the buffer memory, wherein the number of steps, or the size of each step, or both, depends on said measured interval.

From a further aspect, the invention provides a method of transmitting a digital audio stream, the method comprising:

receiving a sequence of incoming radio data packets, transmitted at regular intervals;

measuring an interval between receiving each of a pair of the incoming radio data packets;

inputting audio samples for an outgoing digital audio stream to a buffer memory at a variable buffering rate;

transmitting a sequence of outgoing radio data packets encoding the outgoing digital audio stream, wherein each outgoing radio data packet encodes a respective number of the buffered audio samples, and wherein each respective outgoing radio data packet of the sequence of outgoing radio data packets corresponds to a respective incoming radio data packet of the sequence of incoming radio data packets; and adjusting the variable buffering rate incrementally, in a number of steps, while inputting the audio samples for one radio data packet to the buffer memory, wherein the number of steps, or the size of each step, or both, depends on said measured interval.

The radio transceiver apparatus may have some or any of the features disclosed with reference to the radio receiver apparatus of the preceding aspects. The outgoing digital audio stream may be transmitted over one or more Bluetooth™ Low Energy isochronous channels.

A respective outgoing radio data packet may be sent in response or reply to each incoming radio data packet. The time interval between receiving an incoming radio data packet and transmitting a corresponding outgoing radio data packet may be constant or variable, but is preferably always less than the interval between successive incoming radio data packets.

The buffer memory may be sized to hold the audio samples for at least one, two or more outgoing radio data packets. It may comprise a set (e.g. a pair) of buffers (e.g., first-in-first-out buffers), which may be used cyclically or alternately for buffering the audio samples for respective successive outgoing radio data packets. A pair of buffers, each sized to hold exactly the audio samples for one radio data packet, may provide a particularly memory-efficient implementation, while avoiding buffer underrun.

The audio samples may be output from the buffer memory to a compression unit or codec, for compressing the outgoing digital audio samples before they are transmitted by the radio transmission circuitry.

The digital audio interface may be configured to receive audio samples from a digital microphone, or from an analogue-to-digital converter (ADC), or from another digital audio source, any of which may be internal or external to the radio transceiver apparatus. The oscillator may control the buffering rate by outputting a clock signal to an audio supply component, such as a digital microphone or ADC, which may be used to control the rate at which audio samples are received at the digital audio interface.

The sequence of incoming radio data packets may have empty data payloads or may contain only non-audio data. However, in some embodiments, the sequence of incoming radio data packets may encode a digital audio stream, which may be processed by the radio transceiver, or which may be ignored by the radio transceiver (e.g., being intended for a different apparatus).

In some embodiments, the controllable oscillator used to control the buffering rate for the outgoing audio samples may also be used to control an output rate at which incoming audio samples of an incoming digital audio stream are output from a digital audio output interface of the apparatus. The output rate may be identical to the buffering rate (e.g. if the incoming and outgoing audio streams have the same bitrate), or there may be a constant ratio between the output rate and the buffering rate. The same digital audio interface may be used both for incoming and outgoing audio samples, or there may be different respective interfaces.

In any embodiments disclosed herein, the transmitter, receiver or transceiver apparatus may comprise any one or more of: processors, power supplies, digital logic, DSPs, ASICs, volatile memory, non-volatile memory (e.g., for storing software and/or persistent data), active electronic components, passive electronic components, antennas, amplifiers, filters, timers, inputs, outputs, etc.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
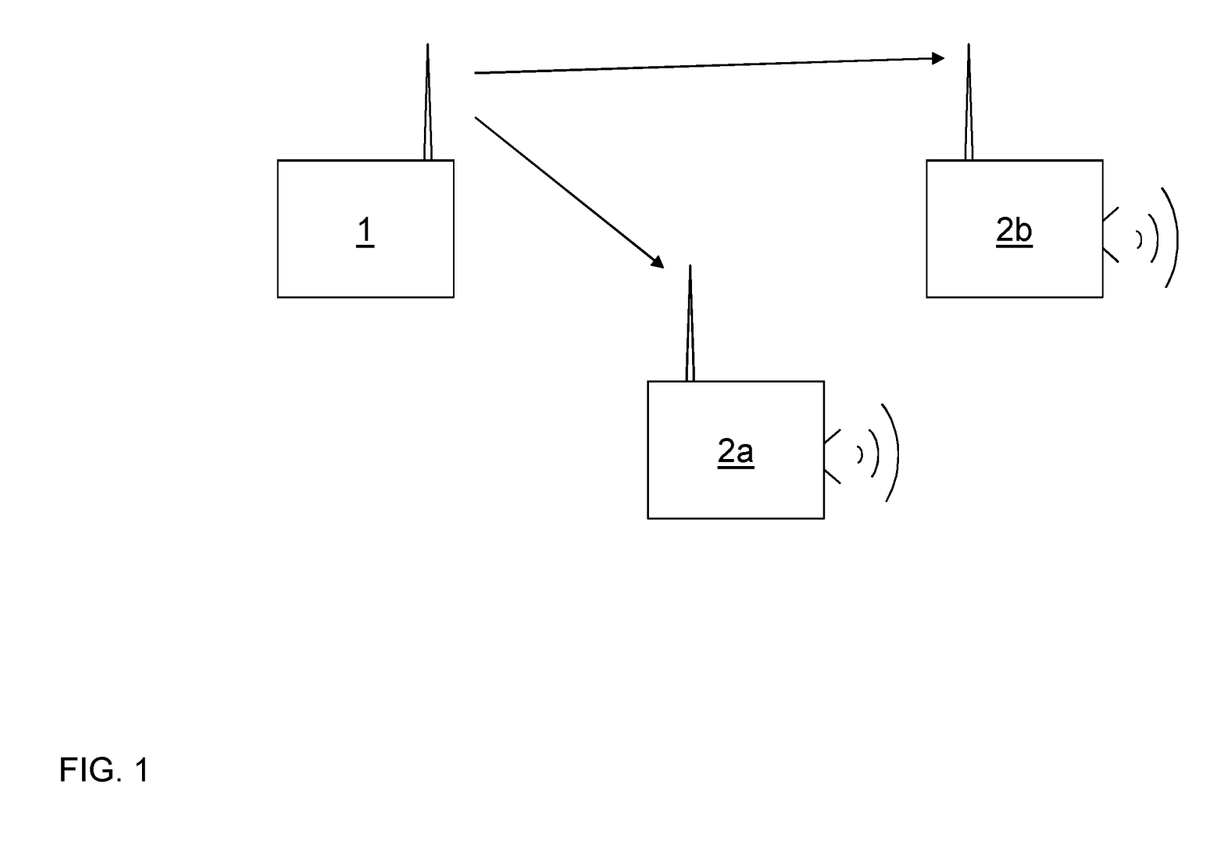
FIG. 1 is a schematic diagram of an audio distribution system embodying the invention.

FIG. 1 shows a system for distributing a stereo audio stream from a server 1 to a pair of wireless speakers 2a, 2b. The server 1 sends the left audio stream, encoded in a first sequence of radio data packets, to a first of the wireless speakers 2a, and sends the right audio stream, encoded in a second sequence of radio data packets, to a second of the wireless speakers 2b.

The server 1 may send the radio data packets using any appropriate radio protocol. The data packet structure may be specified by the protocol. In one set of embodiments, the packets comply with a version of the Bluetooth™ Low Energy protocol.

It is important that the two speakers 2a, 2b play back the left and right audio streams accurately and at the correct speed, so that the left and right audio outputs are correctly synchronised.

The speakers 2a, 2b do not have internal clocks that are already accurately synchronised with the server 1. Instead, they use the timing of the radio packet stream itself to control the speed of the audio playback, as explained below.

Figure 2:
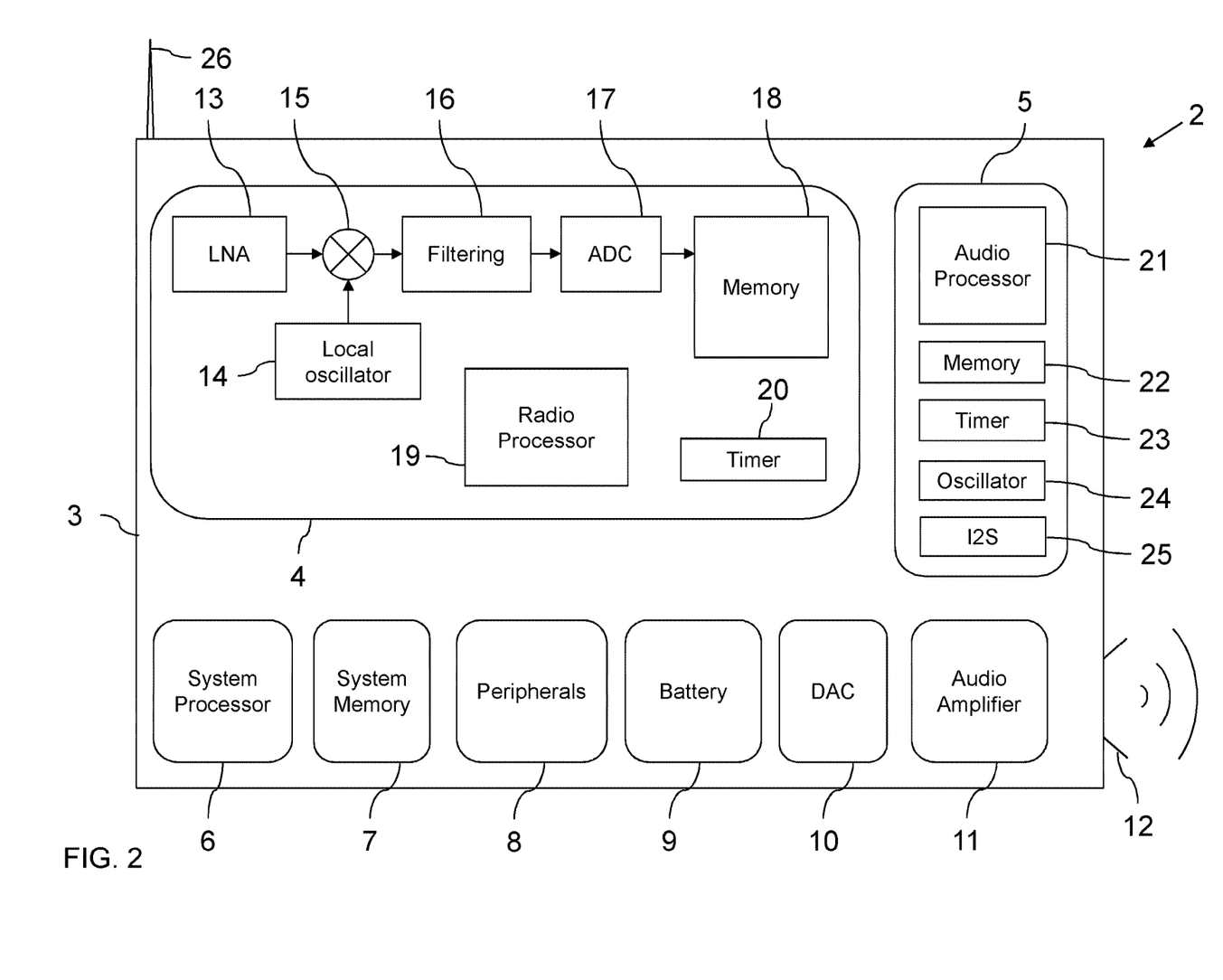
FIG. 2 is a schematic diagram of a receiver apparatus embodying the invention.

FIG. 2 provides more detail of some of the internal hardware components of the speakers 2. The two speakers 2a, 2b have substantially the same hardware and software (although they may behave differently—e.g. if the radio protocol requires one of the speakers 2a, 2b to take a primary role and the other a secondary role).

The speaker 2 contains, within a housing 3, a radio microcontroller chip 4, an audio microcontroller chip 5, as well as other components 6-11.

The radio chip 4 supports Bluetooth™ Low Energy communications. It may also support other radio protocols such as IEEE 802.11, 3GPP LTE Cat-M1, 3GPP LTE NB-IoT, IEEE 802.15.4, Zigbee™, Thread™, ANT™, etc. It contains radio receiver circuitry, including a low-noise amplifier (LNA) 13, a local oscillator (LO) 14, a quadrature mixer 15 for downmixing an incoming radio-frequency signal, signal filtering 16, an analog-to-digital converter (ADC) 17, radio memory 18 and a radio processor 19. The radio memory 18 may include volatile memory (e.g., RAM) and non-volatile memory (e.g., flash). The radio processor 19 may be a general purpose processor such as an Arm™ Cortex-M™ processor; it may also include one or more DSPs. The radio chip 4 includes a timer 20, but may also include other peripherals, buses, etc., which are omitted here for the sake of simplicity.

The device 2 also contains a separate audio microcontroller chip 5, which includes its own processor 21 and memory 22 (for storing software and data), as well as a timer 23, a frequency-adjustable low-jitter oscillator 24 and an Inter-IC Sound (I2S) output peripheral 25. It may include other peripherals, buses, etc.

The device 2 further comprises a system processor 6, system memory 7, various peripherals 8 such as further timers and I/O modules, and a battery 9. One peripheral of particular note is a digital-to-analog (DAC) 10, which is connected to the I2S peripheral 25 of the audio microcontroller chip 5 by an I2S bus. An audio amplifier 11 is configured to amplify analog audio signals output by the DAC 10 in order to drive a loudspeaker 12.

The various components of the device 2 may be connected by one or more printed circuit boards and/or may be integrated in one or more silicon chips in any appropriate combinations. A radio antenna 26 may be located within the housing 3, or externally, and is connected to the radio chip 4. It will be appreciated that the device 2 may contain other elements, such as buses, crystals, digital logic, analog circuitry, discrete active components, discrete passive components, further processors, user interface components, etc. which are not shown in FIG. 2 for the sake of simplicity.

In use, software stored in the radio memory 18 is executed by the radio processor 19 to implement relevant functions of a Bluetooth™ Low Energy protocol stack. The radio processor 19, in combination with the audio microcontroller 5, also manages the processing of the audio stream from the server 1.

Packets containing compressed audio are transmitted by the server 1 periodically—e.g. every 10 ms—as measured by a clock of the server 1. The times of transmission can be assumed to be jitter free. Each radio data packet contains a number of audio samples sufficient to generate audio output for at least the duration of the interval between successive packets—e.g., at least 10 ms of audio. For example, mono audio sampled at 48 kHz will have 480 samples in each packet, if the packets are transmitted every 10 ms (48, 000*10 ms=480). The samples are compressed with an appropriate codec. The data packets may additionally encode metadata associated with the audio stream, such as sample rate and width.

Figure 3:
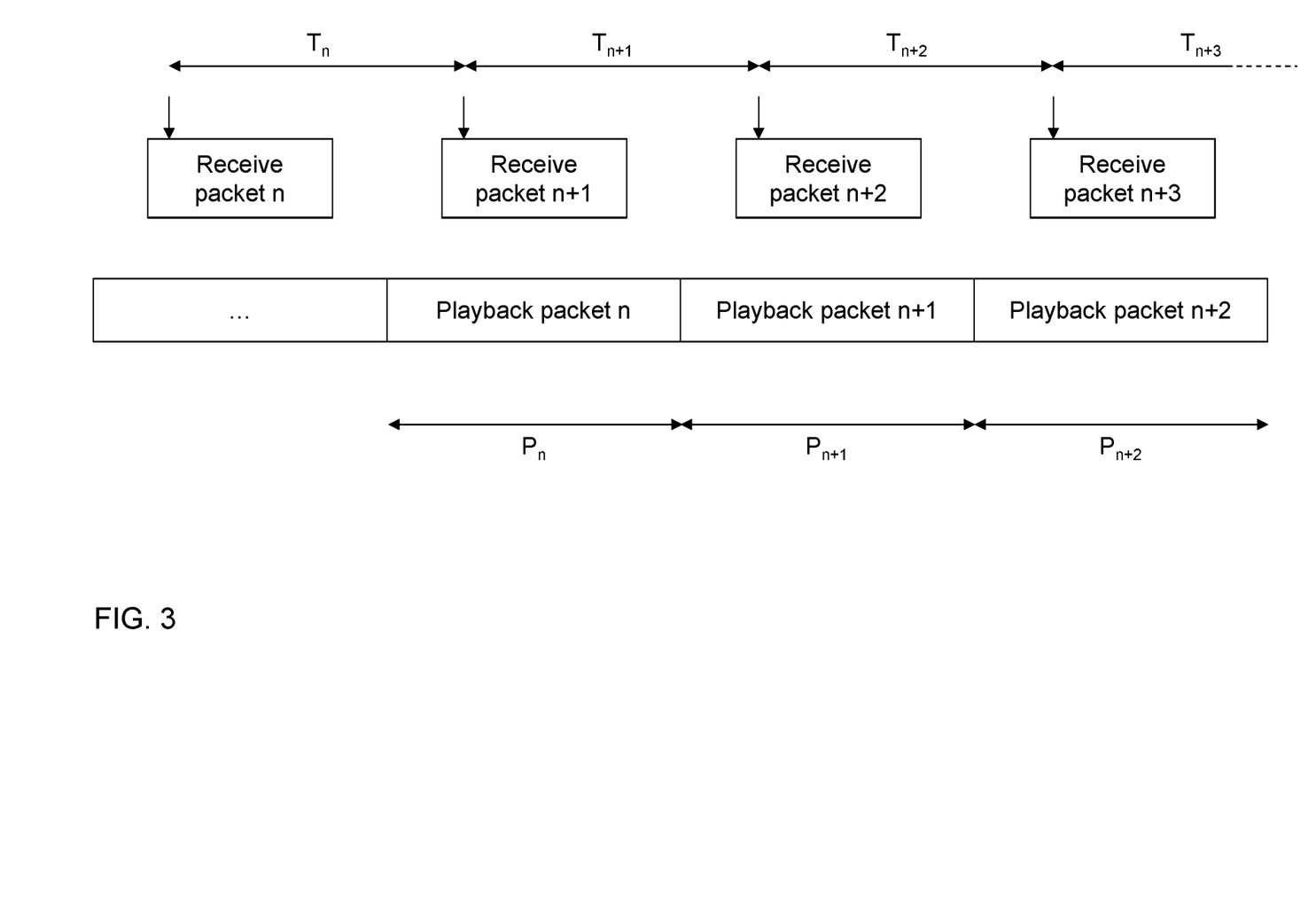
FIG. 3 is a timing diagram showing radio data packets being received and processed according to an embodiment of the invention.

FIG. 3 illustrates a key principle used by the wireless speaker system 1, 2 to ensure synchronous audio output.

When the speaker 2a, 2b receives each radio packet, it determines the time interval, $T_k$, that has elapsed between receiving a current packet, k+1, and receiving the immediately preceding packet, k. It does this by timing the interval between the times of arrival of a common point in each respective packets—e.g., the arrival times of the respective address fields of the packets (represented by the vertical arrows in FIG. 3).

The frequency-adjustable low-jitter oscillator 24 determines the rate at which audio is output from the audio microcontroller 5—i.e. the playback sample clock rate. The frequency of this oscillator 24 is controlled by a software algorithm, which adjusts the oscillator 24 frequency output based on any difference between the measured interval $T_k$ and the playback duration $P_k$ of the packet k. The playback interval $P_{k+1}$ for packet k+1 thus depends on the time interval $T_k$ and can be controlled to compensate for any early inaccuracy in the playback rate. In this way, the playback rate of each loudspeaker 2a, 2b is matched to the clock of the server 1, rather than being dependent on a local, unsynchronised clock within each loudspeaker 2a, 2b, and so the playback rates of the two loudspeakers 2a, 2b are kept aligned (at least on average over a suitable time period). The software algorithm adjusts the oscillator 24 incrementally while the audio stream carried by the current data packet k is being output so as to avoid any sudden jumps in the rate, which might otherwise lead to audible artefacts.

Figure 4:
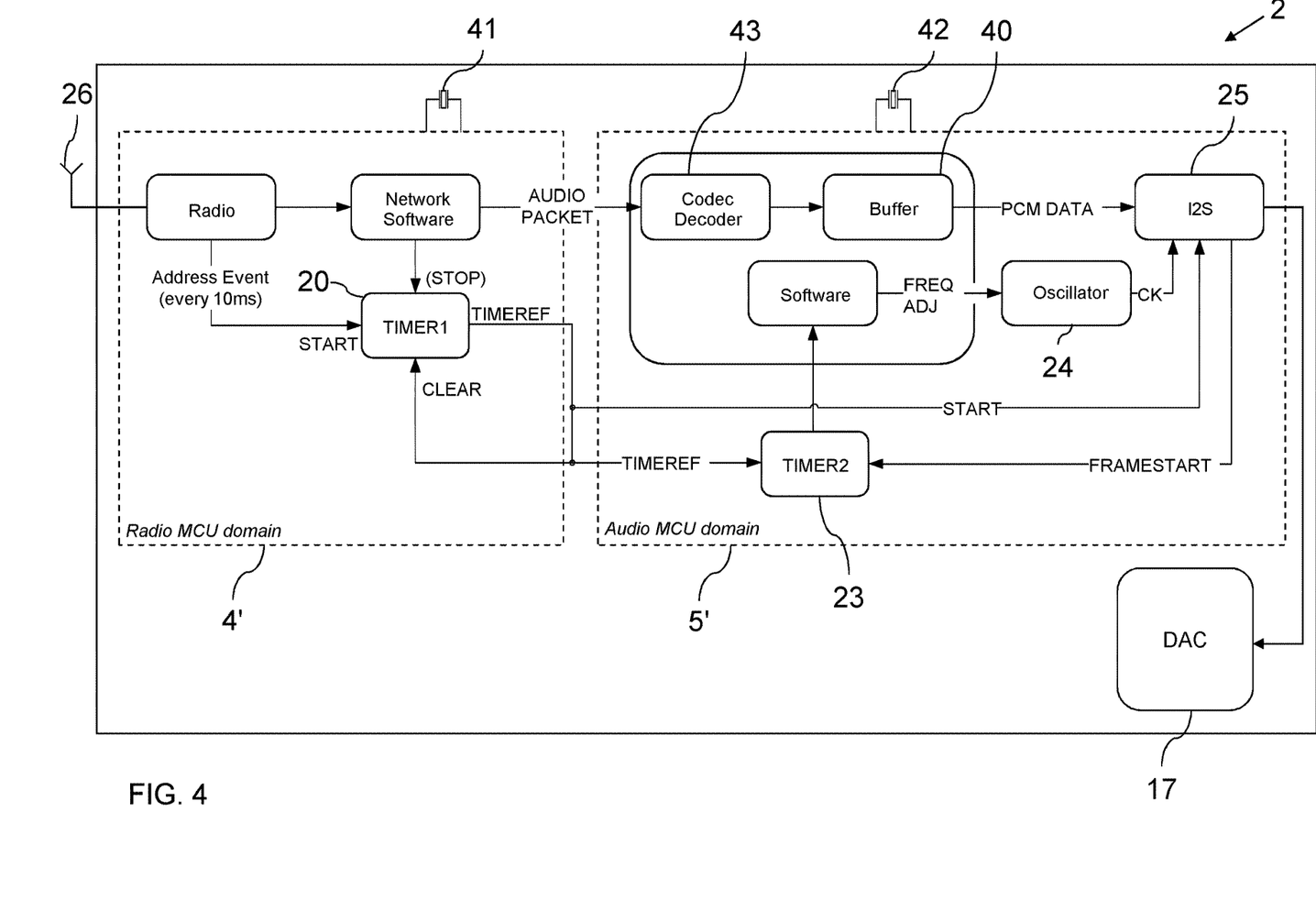
FIG. 4 is a schematic diagram of elements of the software and hardware architecture of the receiver apparatus.

FIG. 4 shows the hardware and software components, in each loudspeaker 2, that cooperate to control the rate at which the received audio stream is output to the DAC 17 from the I2S peripheral 25. The operations are shared between the radio microcontroller unit (MCU) domain 4' and the audio MCU domain 5'.

The radio components in the radio MCU domain 4' are configured to detect the time when the address of an incoming radio packet is received, with little or no jitter. The detection of this address can fix a very precise point in time, suitable for defining the time when the packet was received. The radio signals an "address" event on every detection.

The radio processor 19 receives the packet and decodes it. If the packet contains audio data, a slightly delayed version of the "address" event is forwarded to the audio MCU domain 5', over an inter-processor communication channel. The added delay provides sufficient time for the radio processor 19 to fully decode the incoming frame, plus sufficient processing time for the audio microcontroller 5 to process the audio data. The added delay is constant and jitter-free, and is timed by a crystal oscillator 41 associated with the radio MCU domain 4'. This delayed address event serves as a "time reference" event.

In more detail, the reception of the address event triggers the start of a timer 20 (TIMER1) in the radio MCU domain 4'. This timer 20 is configured to output a TIMEREF event signal after the predetermined added delay period. This TIMEREF event is the time reference event. It is distributed to the audio MCU domain 5' over an inter-processor communication channel, where it is received by the I2S peripheral 25 and by a second timer 23 (TIMER2). The predetermined added delay is the worst-case processing time of both network and audio MCU 4', 5'; this may be determined by analysis or experiment. The TIMEREF event is also fed back to TIMER1 so as to clear TIMER1 ready for the next address event.

Radio packets that are not part of the audio chain can be handled appropriately, without a time reference event being forwarded. This means the loudspeaker 2 is not limited to handling audio only. Any type of radio frames can be sent or received, or other tasks handled, without affecting the audio chain. In particular, if the packet received is not part of the audio chain, the timer 20 is stopped (i.e. cancelled) by the network software (shown as a STOP signal in FIG. 4), to avoid the time reference TIMEREF event being signalled.

In FIG. 4, the TIMER1 runs on a clock (derived from a first crystal 41) that is asynchronous to both the server 1 and the I2S audio output peripheral 25, since the audio MCU domain 5', containing the I2S peripheral 25, is timed by a second crystal 42. In other embodiments, however, the TIMER1 could instead be implemented in the audio MCU domain 5'. In some embodiments, the radio MCU domain 4' and the audio MCU domain 5' may share a crystal.

The time between two successive TIMEREF events is measured with a second timer 23 (TIMER2) in the audio MCU domain 5'. Software executing on the audio processor 21 captures the timer value from the second timer 23 each time a TIMEREF event is signalled by TIMER1. This value represents the latest time interval, $T_k$. The TIMEREF events, although synchronized to the high-frequency clock of the local system 5', mostly depend on the remote system 1 and on the timing of the wireless communication link.

After successful decoding by the radio microcontroller 4, the payload, comprising compressed audio samples and metadata, is transferred to the memory 22 of the audio MCU domain 5'. The audio microcontroller 5 uses a software or hardware codec decoder 43 to decompress the audio data into PCM samples (in a PCM frame), and places them in an audio buffer memory 40, within the memory 22, which is accessible by the I2S audio output peripheral 25. The audio buffer memory 40 comprises a pair of FIFO buffers, each sized to be equal to or larger than a single PCM frame (or the audio contents of a single packet). These buffers may be in system RAM or flash, or may be dedicated registers.

The I2S peripheral 25 can receive a START task input which activates the playback of the very first PCM frame in the audio stream. Each PCM frame is written to one of two frame-sized FIFO buffers in the audio buffer memory 40, in alternating "ping-pong" fashion. The I2S peripheral 25 reads alternately from the two FIFO buffers. The I2S peripheral 25 outputs a FRAMESTART event signal when it begins processing each successive PCM frame. Thus, when playback reaches the end of the first FIFO buffer, the I2S peripheral 25 signals the FRAMESTART event and starts playback from the first FIFO buffer, and vice versa, thereby creating a continuous stream of audio output to the DAC 17.

The FRAMESTART events are received by the second timer 23 (TIMER2), which independently times the intervals, $P_k$, between successive frame starts, in addition to timing the $T_k$ periods. These $P_k$ timer values are captured by software executing in the audio MCU domain 5', in addition to the $T_k$ measurements.

The events and signals referred to herein may be transported over a peripheral interconnect system that is separate from an address or data bus—e.g., as disclosed in the applicant's early application WO 2013/088121.

The I2S samples are output from the I2S peripheral 25 at a clock rate set by the controllable audio oscillator 24. The oscillator 24 provides a memory-mapped register interface, accessible to the audio processor 21. The oscillator 24 can be controlled by software executing in the audio MCU domain 5' by writing appropriate values to three registers: FREQUENCY, FREQINC and FREQINCPERIOD. The value first written to the FREQUENCY register determines a starting frequency for the oscillator 24. The software may set this once at the start of the audio stream (e.g., based on metadata received from the server 1). The FREQINC and FREQINCPERIOD registers are used to change the output frequency of the oscillator gradually. A value in FREQINCPERIOD defines a time period for a timer in the oscillator 24. If a non-zero signed value is written to FREQINC, the oscillator 24 begins to add this signed value to the current output frequency, stored in the FREQUENCY register, as a frequency increment, repeatedly, every time period defined by FREQINCPERIOD.

The register interface can be summarised as follows:
FREQUENCY: Indicates the current oscillator frequency. Step size is around 3 ppm.
FREQINCPERIOD: Frequency increment period, in the range 0 μs to 10 μs, adjustable in 1 μs steps.
FREQINC: At every FREQINCPERIOD, this signed value is added to the current frequency. Resolution is around 3 ppm.

Figure 5:
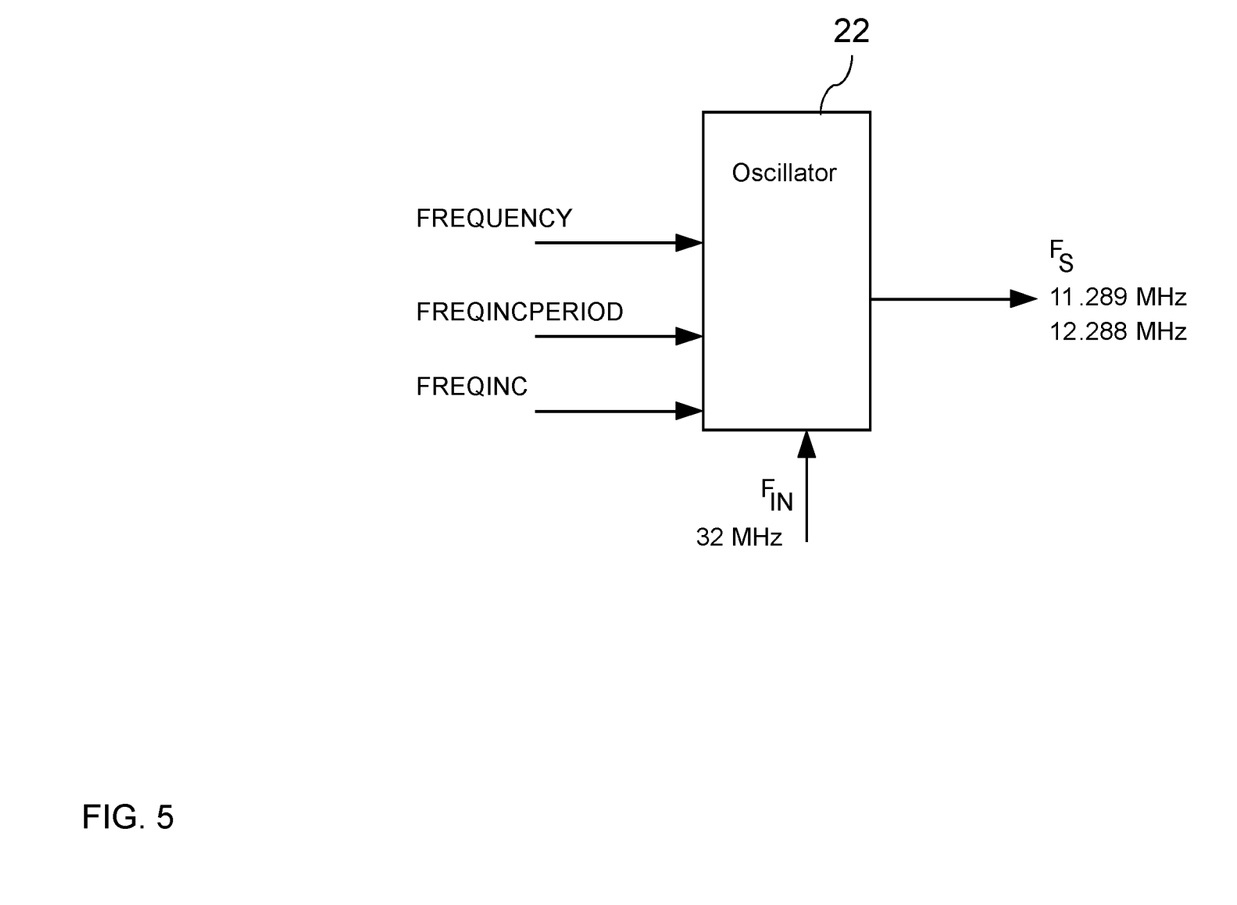
FIG. 5 is a schematic diagram of a controllable oscillator of the receiver apparatus.

FIG. 5 shows the controllable oscillator 24 in more detail. The oscillator 24 is a hardware module that generates a signal having an output frequency, $F_s$. This signal controls the rate of transfer of audio samples over the I2S bus to the DAC 17 and thereby provides a clock reference to the DAC 17. It takes a 32 MHz input as a reference, derived from the second crystal 42, and can generate a tunable output frequency based on one of two selectable nominal frequencies: 11.289 MHz and 12.288 MHz. These two frequencies are each tunable between +/−1% to support all popular sample rates in Audio DACs. The oscillator 24 comprises a MASH (1,1) sigma-delta modulator (SDM) which is used to achieve a frequency resolution of 3.3 ppm with 200 ps typical jitter.

Software, executing in the audio MCU domain 5', compares the time between two frame start events to the time between two time reference events, and thereby determines by how much the local sample clock is too slow or too fast, compared with the clock used by the server 1 for transmitting the radio packets. It uses this information to write appropriate FREQINC and FREQINCPERIOD values so that the frequency of the oscillator 24 converges on the required frequency.

The software may use any suitable algorithm for adjusting the local audio oscillator 24 frequency to reach the target goal. A set of synchronised loudspeakers 2a, 2b may require greater precision than a single playback device (e.g. a mono audio device)—for example, samples time-aligned with microsecond precision—and may therefore benefit from a different adjustment procedure than a system comprising a single playback device.

One possible algorithm is a linear adjustment, where the frequency is linearly increased or decreased to a level so that the average playback speed (e.g. the mean over every two packets) matches the audio transmission rate of server 1. However, more sophisticated algorithms may be used to minimize distortion caused by the frequency adjustments.

If the frequency offset (or error) between the frequency at the start of a packet and a target frequency at the end of the packet (having duration 10 ms) is $F_{err}$, the software may select a pair of FREQINC and FREQUINCPERIOD values that satisfy $F_{err}$=FREQINC×(10 ms/FREQINCPERIOD). In some situations, there may be multiple possible FREQINC and FREQUINCPERIOD pairs that could be used to produce a desired frequency adjustment. In such cases, the software may select the smallest available FREQINC value (i.e. with the largest number of steps); this may help to minimise audible distortion. For very small errors, FREQINC would be set to the minimum possible non-zero value (e.g. 1 ppm), and FREQINCPERIOD would be as large as is required to minimize $F_{err}$. For large errors, a FREQINC of 1 ppm may be too small an increment to correct for $F_{err}$, even at the fastest update rate (e.g. with a FREQINCPERIOD of 1 µs), so here FREQINC would be set greater than 1 ppm but still as small as possible.

In some embodiments, FREQINCPERIOD may be set so that the average sample rate is always attained (possibly with some overshoot, as explained below with reference to FIG. 6) within the duration of the next-received PCM frame.

The output frequency of the oscillator 24 is adjusted gradually so that the playback PCM-frame rate matches the received frame rate. Once convergence is achieved, or once the average (mean) sample playback rate, measured over a period of one or more frames, equals the sample transmission rate of the server 1, over the same period, the loudspeakers 2a, 2b will be synchronized to the server 1 clock, and to each other.

Figure 6:
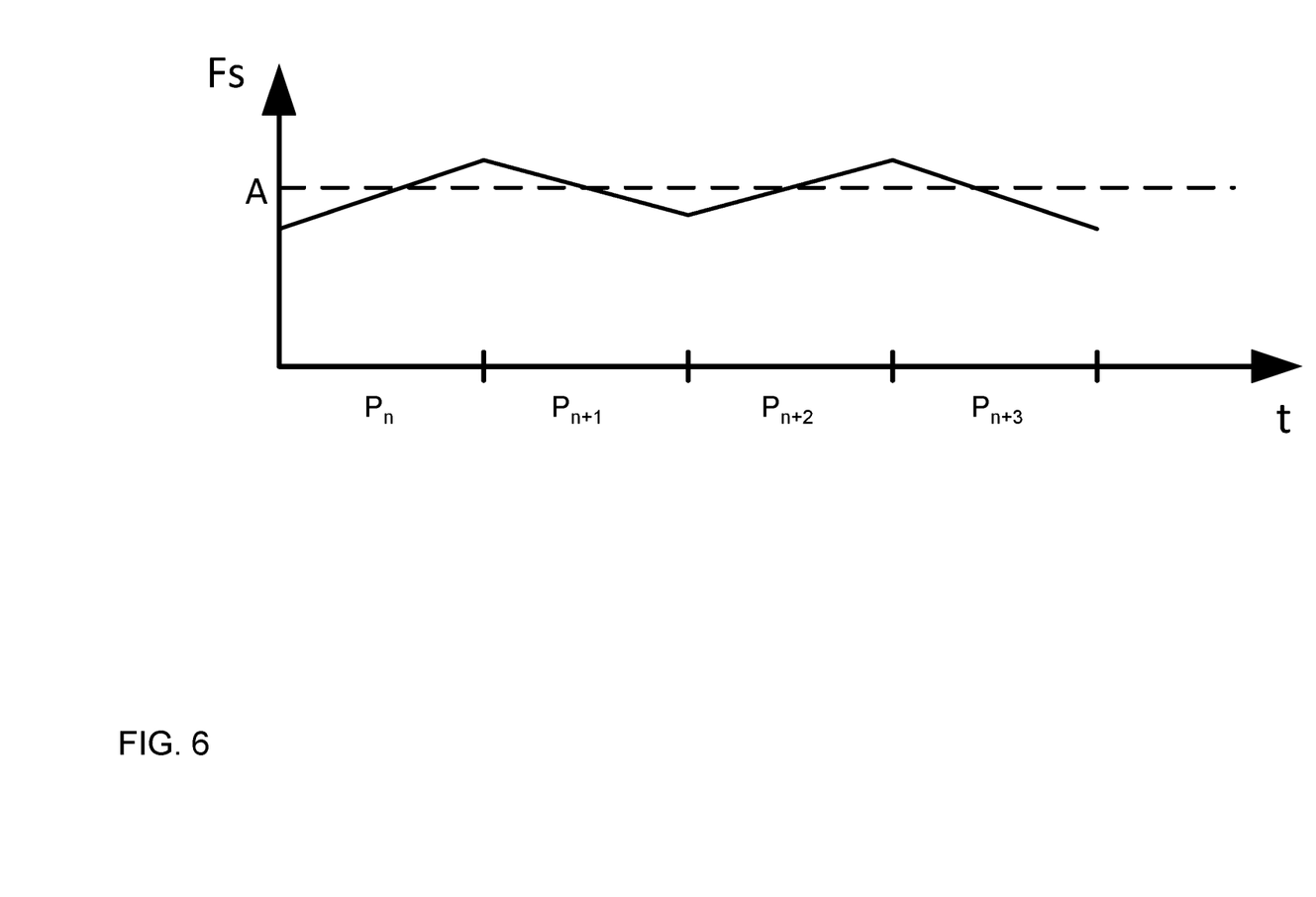
FIG. 6 is a graph of the output frequency of the controllable oscillator over time.

FIG. 6 shows the playback rate being adjusted linearly (using repeated frequency increments) over the duration of each PCM frame, with a gradient that is determined by the values written to FREQINC and FREQINCPERIOD. As can be seen, perfect convergence is never sustained in this example, but the output frequency, $F_s$, instead oscillates to either side of the packet transmission rate set by the server 1, so as to have the correct average rate, A, over every two-frame period.

During the playback period, $P_n$, of frame n, the software increases the playback rate incrementally, based on an earlier determination that the rate was too low. At the start of frame n+1, the software determines that the playback rate is now too high, since the interval, $P_n$, between the FRAMESTART event for frame n+1 and the FRAMESTART event for frame n is less than the interval, $T_n$, between the time reference event for packet n+1 (containing frame n+1) and the time reference event for packet n (containing frame n). The software therefore calculates a suitable negative increment (decrement) and time period, and writes these to the FREQINC and FREQINCPERIOD registers. This causes the oscillator output to reduce in steps over the duration of the playback of frame n+1, thereby avoiding the risk of buffer underrun caused by fully playing out one FIFO buffer of the audio buffer memory 40 before the packet n+2 has been received into the other FIFO buffer. Because the oscillator 24 needs to be set to compensate for the portion of periods $P_n$ and $P_{n+1}$ during which the playback rate was above the long-term average, A, the frequency will be too high at the end of the period $P_{n+1}$. Therefore, during the next interval, $P_{n+2}$, the software writes a positive increment and time period to the FREQINC and FREQINCPERIOD registers.

As well as giving the correct average rate over a two-frame period, so avoiding buffer underrun or overflow, this approach can also inherently adjust for any long-term changes in the frequency of the server 1 clock (e.g., due to temperature changes).

Of course, while the audio buffer memory 40 is here described as buffering only two frames, to minimise latency, other embodiments may provide a larger buffer and may update the oscillator 24 settings at different time points, but with the same overall effect.

To ensure that the playback of the very first PCM frame of an audio stream (i.e. encoded in packet $P_0$) starts at the correct time, the initial time reference event is used to start the I2S peripheral 25, by triggering the START task for the I2S peripheral 25. This may be done over a dedicated event signalling line that connects the radio MCU domain 4' to the I2S peripheral 25, rather than over a bus that may be subject to contention. In this way, the delay may be predictable (e.g., one CPU cycle). If both loudspeakers 2a, 2b implement the same delay, their audio streams will both be synchronised to the transmissions from the server 1, and therefore to each other.

Then, at each FRAMESTART event, a new frequency adjustment is calculated and implemented. In some embodiments, software may also use the time reference event to align the playback of a single sample. Typically, this might be used to align the playback of the very first sample in a PCM stream.

Figure 7:
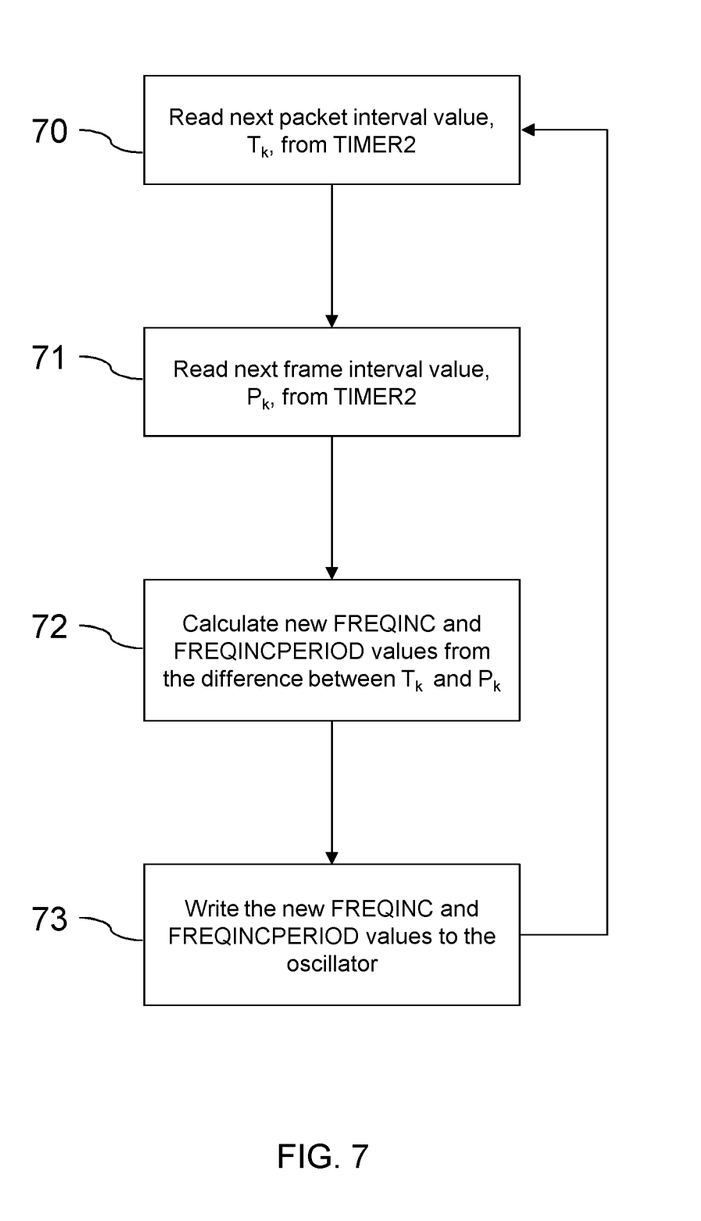
FIG. 7 is a flow diagram of steps performed by software executing in the receiver apparatus.

FIG. 7 summarises the main steps carried out by the software executing on the device 2 when decoding an audio stream. The software reads 71 the next packet interval value, $T_k$, from the second timer 23 (TIMER2). It then reads 72 the next frame interval value, $P_k$, from the second timer 23. Next, it calculates 73 new FREQINC and FREQINCPERIOD values from the difference between $T_k$ and $P_k$, as described above. It then writes 74 these values to the register interface of the oscillator 24. The steps are repeated until the end of the audio stream is reached.

Figure 8:
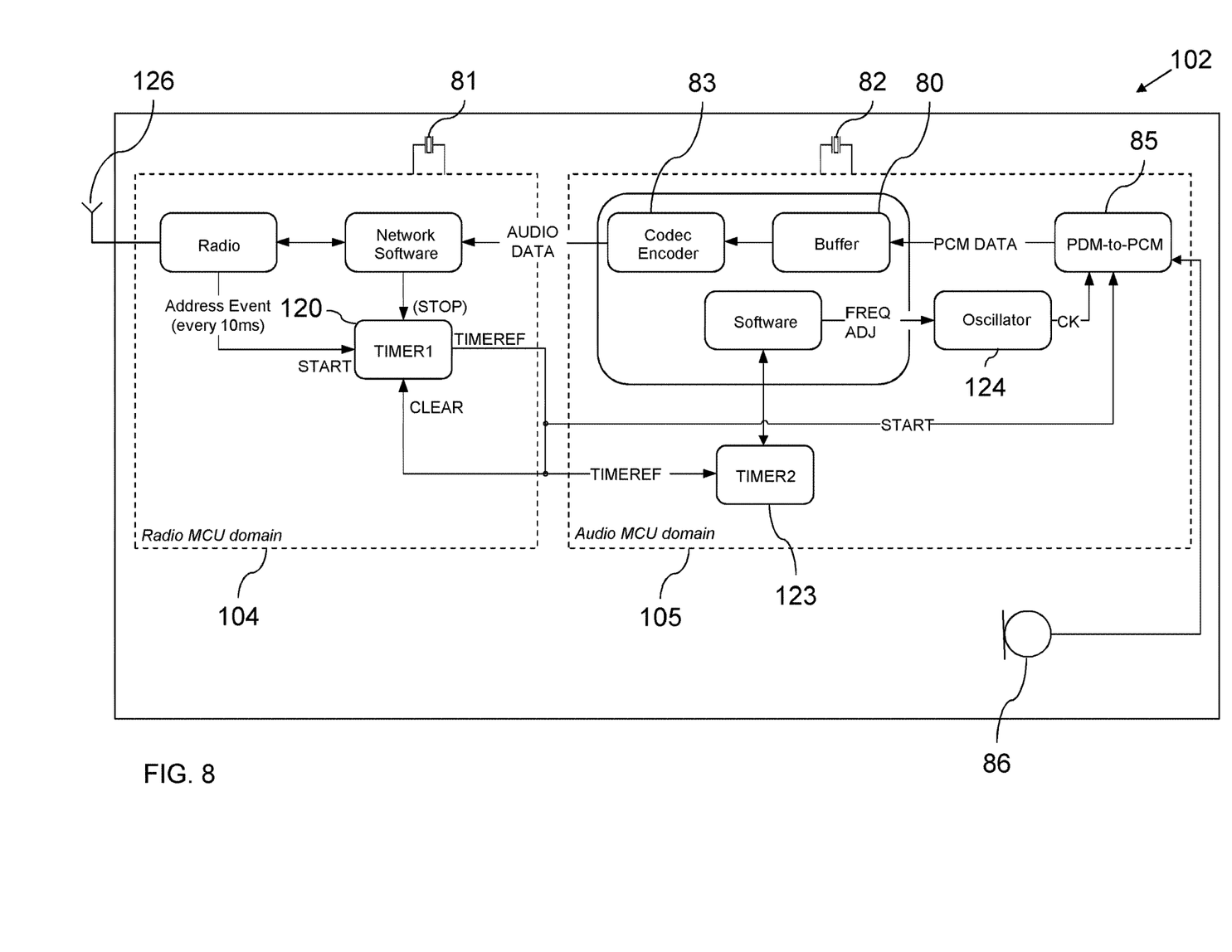
FIG. 8 is a schematic diagram of elements of the software and hardware architecture of an audio recording apparatus embodying the invention.

FIG. 8 shows selected hardware and software components from an alternative embodiment of the invention, which is an audio recording apparatus 102, such as a wireless microphone, which can convert received sonic signals into audio data and transmit the audio data by radio.

The recording apparatus 102 has features in common with the loudspeaker 2 shown in FIG. 4, such as a radio MCU domain 104 and an audio MCU domain 105 which are similar (but not identical) to the domains 4', 5' shown in FIG. 4.

The recording apparatus 102 contains a digital microphone 86, which outputs a pulse-density modulated (PDM) electrical signal. This is received by a PDM-to-PCM converter 85 located in the audio MCU domain 105, which converts the PDM signal to pulse-code modulated (PCM) data, which is input to an audio buffer memory 80. The audio buffer memory 80 comprises a pair of frame-sized FIFO buffers, each sized to hold a single PCM frame (or the audio contents of a single packet). These buffers may be in system RAM or flash, or may be dedicated registers. As before, each PCM frame is written to a respective one of the frame-sized FIFO buffers in alternating "ping-pong" fashion. The buffered audio is then taken, in 10 ms blocks, and compressed by a codec encoder 83, before being passed to the radio MCU domain 104 for radio transmission—e.g., over a Bluetooth™ Low Energy isochronous channel.

A frequency-adjustable low-jitter oscillator 124 in the audio MCU domain 105 controls the sampling rate from the digital microphone 86, which thereby determines the filling rate of the audio buffer memory 80.

Alternative embodiments may contain an analogue microphone and an external ADC, which may interface with the audio MCU domain 105 through an I2S bus. The oscillator 124 would then control the sampling rate of the external ADC.

Within the radio MCU domain 104, incoming data packets are received approximately once every 10 ms. As before, the reception of the address event triggers the start of a timer 120 (TIMER1), which outputs a TIMEREF event signal after the predetermined added delay period. The time between successive TIMEREF events is measured with a second timer 123 (TIMER2) in the audio MCU domain 105. Software executing in the audio MCU domain 105 uses these time intervals to control the sample rate of the recorded audio, as described below.

The oscillator 124 may be identical to the oscillator 24 described with respect to the preceding embodiments, including having the same register interface. The oscillator 124 is controlled based on the intervals between radio packets received by the apparatus 102 from a remote radio transceiver (not shown), using the same principles as disclosed above in the context of received audio. In this case, however, the incoming radio packets need not necessarily carry incoming audio data for processing by the apparatus 102 (although they may do so). Instead, they may serve principally as a timing signal for the recording apparatus 102, without containing audio data. The apparatus 102 replies to each incoming radio packet by transmitting, from the antenna 126, a respective response radio packet containing a predetermined quantity of compressed PCM data (e.g. corresponding to 10 ms of decompressed audio), derived from the microphone 86.

Similarly to the preceding embodiments, software, executing in the audio MCU domain 105, measures the time it takes to fill one of the FIFO buffers in the audio buffer memory 80 and compares this against the time between two time reference events set by two received incoming radio packets. It thereby determines by how much the microphone sample clock is too slow or too fast, compared with the clock that the remote radio transceiver uses for timing the transmission of the incoming radio packets. It uses this information to write appropriate FREQINC and FREQINCPERIOD values to the oscillator 124 so that the frequency of the oscillator 124 achieves the required average frequency over time, to avoid overflow or underrun of the audio buffer memory 80. As before, the software may use any suitable algorithm for adjusting the local audio oscillator 24 frequency to reach a target goal.

In this way, the audio-bearing radio transmissions from the apparatus 102 are synchronised to the clock of the external radio transceiver, rather than depending on the crystals 81, 82 of the recording apparatus 102. This ensures that the apparatus 102 can always send a timely response, containing a fixed length of audio data, to each incoming radio packet, without risk of overflow or underrun of the audio buffer memory 80.

Any of the relevant features disclosed with reference to the embodiment of FIG. 4 may be used in this recording embodiment also.

Further embodiments combine an audio receiving system, e.g. similar to the speaker 2 shown in FIGS. 2 & 5, with an audio recording system, e.g. similar to the microphone apparatus 102 shown in FIG. 8. Such apparatus can both record and output audio, potentially simultaneously. It could, for example, be a wireless home assistant device, which can simultaneously send a recording of a user's voice command by radio to a server. while outputting music received from the server by radio. In some situations, the apparatus may respond to each incoming radio packet, bearing a frame of compressed incoming audio, with a respective outgoing radio packet, bearing a frame of compressed outgoing audio, with the timing of the recording and playback rates being determined by the intervals between the incoming radio packets, as described above.

The apparatus may use the same hardware for implementing some of the common elements shown in FIGS. 5 & 8, such as using the same radio for receiving and transmitting data. In particular, it may use a single oscillator 24/124 to control the rate at which audio samples are written into an outgoing audio buffer memory 80 and the rate at which samples are read out of an incoming audio buffer memory 40. If the audio bitrate is the same for the incoming and outgoing streams, the uncompressed duration of the compressed audio data stored in each frame will be the same, and the buffer write rate and read rate may be identical. If the sample rates are different, the same oscillator may still be used, but with the write and/or read rate being derived from the oscillator output by appropriate integer and/or fractional scaling.

It will be appreciated by those skilled in the art that the invention has been illustrated by describing one or more specific embodiments thereof, but is not limited to these embodiments; many variations and modifications are possible, within the scope of the accompanying claims.

In particular, it will be appreciated that the steps of FIG. 7, and other steps disclosed herein, may, in other embodiments, be implemented using hardwired logic circuitry, instead of software executing on a processor. In some embodiments, it may therefore not be necessary for the audio MCU domain to include a processor at all.

The invention claimed is:
1. A radio receiver apparatus comprising:
radio circuitry for receiving a sequence of radio data packets, transmitted at regular intervals, the sequence of radio data packets encoding a digital audio stream,
wherein each radio data packet encodes a respective number of audio samples from the digital audio stream;
a digital audio interface for outputting audio samples from the received digital audio stream;
a controllable oscillator arranged to control an output rate at which the audio samples are output from the digital audio interface;
a timer; and
control logic configured to
use the timer to measure a reception interval between receiving each of a pair of the radio data packets, and,
for at least one radio data packet of the sequence, to control the oscillator to vary said output rate incrementally, in a respective number of steps of non-zero size, while outputting the audio samples from the respective radio data packet,
wherein the respective number of steps is at least two steps, and
wherein the respective number of steps, or the respective size of each step, or both, depends on said measured reception interval and is such that the output rate is always positive.

2. The radio receiver apparatus of claim 1,
wherein the control logic is configured to adjust the variable output rate incrementally, in at least a hundred steps, while outputting the audio samples from one radio data packet.

3. The radio receiver apparatus of claim 1,
wherein the control logic is configured to determine a respective step size for outputting the audio samples of each successive radio data packet of the sequence.

4. The radio receiver apparatus of claim 1,
wherein the control logic is configured to use the timer to measure the reception intervals between receiving every adjacent pair of radio data packets within the sequence.

5. The radio receiver apparatus of claim 1,
wherein the control logic is further configured to measure an output interval between outputting each of a pair of output frames of audio samples, where each output frame consists of the audio samples contained in a respective radio data packet, and is configured to determine the number of steps, or the size of each step, or both, additionally based on said measured output interval between a pair of output frames.

6. The radio receiver apparatus of claim 1,
wherein the controllable oscillator
provides an interface for receiving data, from the control logic, that is representative of the step size, and for receiving data, from the control logic, that is representative of the number of steps, and
comprises circuitry for making incremental changes to a periodic output of the oscillator in dependence on the received data representative of the step size and further in dependence on the received data representative of the number of steps.

7. The radio receiver apparatus of claim 1, further comprising a digital-to-audio converter for receiving the audio samples from the digital audio interface.

8. The radio receiver apparatus of claim 7, further comprising an amplifier and an acoustic transducer for outputting the digital audio stream as sound.

9. The radio receiver apparatus of claim 1, further comprising radio transmission circuitry and being configured to transmit a sequence of outgoing radio data packets encoding an outgoing digital audio stream.

10. The radio receiver apparatus of claim 9, comprising:
an outgoing digital audio interface for receiving audio samples for transmission in the outgoing digital audio stream;
a buffer memory for buffering the audio samples received at the outgoing digital audio interface;
the controllable oscillator, or a further controller oscillator, configured to control a buffering rate at which audio samples for transmission are input to the buffer memory; and
control logic configured, for at least one radio data packet of the sequence of outgoing radio data packets, to control the controllable oscillator to vary said buffering rate incrementally, in a respective number of steps of non-zero size, while inputting the audio samples for the respective radio data packet to the buffer memory,
wherein the respective number of steps is at least two steps, and
wherein the respective number of steps, or the respective size of each step, or both, depends on said measured reception interval and is such that the buffering rate is always positive.

11. A radio communication system comprising a radio transmitter apparatus and the radio receiver apparatus of claim 1,
wherein the radio transmitter apparatus is configured to transmit the sequence of radio data packets to the radio receiver apparatus at regular intervals, the sequence of radio data packets encoding the digital audio stream.

12. The radio communication system of claim 11, further comprising a second radio receiver apparatus,
wherein the radio transmitter apparatus is configured to transmit a second sequence of radio data packets to the second radio receiver apparatus at regular intervals, the second sequence of radio data packets encoding a second digital audio stream,
wherein each radio data packet of the second sequence encodes a respective number of audio samples from the second digital audio stream, and
wherein the second radio receiver apparatus comprises:
radio circuitry for receiving the second sequence of radio data packets;
a digital audio output for outputting audio samples from the received second digital audio stream;
a controllable oscillator arranged to control an output rate at which the audio samples from the second digital audio stream are output from the digital audio output;
a timer; and
control logic configured to use the timer to measure a second receiver reception interval between receiving each of a pair of the radio data packets of the second sequence, and, for at least one radio data packet of the second sequence, to control the oscillator to vary said output rate incrementally, in a respective number of steps of non-zero size, while outputting the audio samples from the respective radio data packet of the second sequence,
wherein the respective number of steps is at least two steps, and
wherein the number of steps, or the size of each step, or both, depends on said measured second receiver reception interval and is such that the output rate is always positive.

13. The radio communication system of claim 12,
wherein the first and second audio streams are left and right audio streams of a stereo audio stream.

14. The radio receiver apparatus of claim 1,
wherein the digital audio interface is an external port of the radio receiver apparatus or is a connection to a bus of the radio receiver apparatus.

15. A method of processing a digital audio stream, the method comprising:
receiving a sequence of radio data packets, transmitted at regular intervals, the sequence of radio data packets encoding a digital audio stream,
wherein each radio data packet encodes a respective number of audio samples from the digital audio stream;
outputting audio samples from the received digital audio stream at a variable output rate;
measuring a reception interval between receiving each of a pair of the radio data packets; and
for at least one radio data packet of the sequence, adjusting the variable output rate incrementally, in a respective number of steps of non-zero size, while outputting the audio samples from the respective radio data packet,
wherein the respective number of steps is at least two steps, and wherein the number of steps, or the size of each step, or both, depends on said measured reception interval and is such that the output rate is always positive.

16. The method of claim 15, comprising adjusting the variable output rate incrementally, in at least a hundred steps, while outputting the audio samples from one radio data packet.

17. The method of claim 15, comprising determining a respective step size for outputting the audio samples of each successive radio data packet of the sequence.

18. The method of claim 15, comprising measuring reception intervals between receiving every adjacent pair of radio data packets within the sequence.

19. The method of claim 15, comprising
measuring an output interval between outputting each of a pair of output frames of audio samples,
where each output frame consists of the audio samples contained in a respective radio data packet, and
wherein the number of steps, or the size of each step, or both, depends additionally on said measured output interval between a pair of output frames.

20. A radio transceiver apparatus comprising:
radio reception circuitry for receiving a sequence of incoming radio data packets, transmitted at regular intervals;
radio transmission circuitry for transmitting a sequence of outgoing radio data packets encoding an outgoing digital audio stream,
wherein each respective outgoing radio data packet of the sequence of outgoing radio data packets corresponds to a respective incoming radio data packet of the sequence of incoming radio data packets;
a digital audio interface for receiving audio samples for transmission in the outgoing digital audio stream;
a buffer memory for buffering the audio samples received at the digital audio interface;
a controllable oscillator configured to control a buffering rate at which audio samples are input to the buffer memory;
a timer; and
control logic configured to
use the timer to measure a reception interval between receiving each of a pair of the incoming radio data packets, and,
for at least one radio data packet of the sequence of outgoing radio data packets, to control the oscillator to vary said buffering rate incrementally, in a respective number of steps of non-zero size, while inputting the audio samples for the respective radio data packet to the buffer memory,
wherein the respective number of steps is at least two steps, and
wherein the number of steps, or the size of each step, or both, depends on said measured reception interval and is such that the buffering rate is always positive.

* * * * *